(12) United States Patent
Zhu

(10) Patent No.: US 12,166,601 B2
(45) Date of Patent: Dec. 10, 2024

(54) GENERATION OF TUNNEL ENDPOINT IDENTIFIER FOR PACKET TUNNELING

(71) Applicant: NOKIA TECHNOLOGIES OY, Espoo (FI)

(72) Inventor: Tianda Zhu, Zhejiang (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 426 days.

(21) Appl. No.: 17/277,081

(22) PCT Filed: Sep. 27, 2018

(86) PCT No.: PCT/CN2018/107993
§ 371 (c)(1),
(2) Date: Mar. 17, 2021

(87) PCT Pub. No.: WO2020/061911
PCT Pub. Date: Apr. 2, 2020

(65) Prior Publication Data
US 2021/0377076 A1 Dec. 2, 2021

(51) Int. Cl.
*H04L 12/00* (2006.01)
*H04L 12/46* (2006.01)
*H04L 45/74* (2022.01)
*H04L 61/45* (2022.01)
*H04L 101/622* (2022.01)

(52) U.S. Cl.
CPC .......... *H04L 12/4633* (2013.01); *H04L 45/74* (2013.01); *H04L 61/45* (2022.05); *H04L 2101/622* (2022.05)

(58) Field of Classification Search
None
See application file for complete search history.

(56) References Cited

U.S. PATENT DOCUMENTS 8,855,071 B1  10/2014 Sankaran et al.
10,736,001 B2 *  8/2020 Chai ................. H04W 36/0069
(Continued)

FOREIGN PATENT DOCUMENTS

CN   101621459 A   1/2010
CN   102388578 A   3/2012
(Continued)

OTHER PUBLICATIONS

International Search Report and Written Opinion dated Jun. 27, 2019 corresponding to International Patent Application No. PCT/CN2018/107993.
(Continued)

*Primary Examiner* — Gerald A Smarth
(74) *Attorney, Agent, or Firm* — SQUIRE PATTON BOGGS (US) LLP

(57) ABSTRACT

Embodiments of the present disclosure relate to a device, method, apparatus and computer readable storage media for generating a tunnel endpoint identifier (TEID) for packet tunneling. In example embodiments, a TEID is generated at a downstream device for a tunnel from an upstream device to the downstream device at least in part based on a target address of an information packet to be transmitted in the tunnel. The generated TEID is sent towards the upstream device for establishment of the tunnel.

18 Claims, 10 Drawing Sheets

(56) References Cited

U.S. PATENT DOCUMENTS

| | | | | |
|---|---|---|---|---|
| 2010/0260129 A1* | 10/2010 | Ulupinar | ............... | H04L 69/04 |
| | | | | 370/329 |
| 2014/0003357 A1* | 1/2014 | Ejzak | ................... | H04W 76/11 |
| | | | | 370/329 |
| 2016/0234752 A1* | 8/2016 | Hsu | ..................... | H04L 12/4641 |
| 2017/0078927 A1* | 3/2017 | Hahn | ............... | H04W 36/0033 |
| 2017/0208011 A1* | 7/2017 | Bosch | .................... | H04L 47/29 |

FOREIGN PATENT DOCUMENTS

| | | | | |
|---|---|---|---|---|
| CN | 103716837 A | 4/2014 | | |
| CN | 104620664 A | 5/2015 | | |
| CN | 106102121 A | 11/2016 | | |
| WO | WO-2006010883 A1 * | 2/2006 | ......... | H04L 12/4633 |
| WO | WO-2015004922 A1 * | 1/2015 | ......... | H04L 12/4633 |
| WO | WO 2015/062063 A1 | 5/2015 | | |
| WO | WO 2016/169218 A1 | 10/2016 | | |
| WO | WO-2016165554 A1 * | 10/2016 | ............. | H04L 45/66 |

OTHER PUBLICATIONS

Extended European Search Report dated Apr. 8, 2022 corresponding to European Patent Application No. 18934678.6.

First Office Action dated Nov. 23, 2023 corresponding to Chinese Patent Application No. 201880098113.6, with English Summary thereof.

Second Office Action dated May 11, 2024 corresponding to Chinese Patent Application No. 201880098113.6, with English translation thereof.

Communication under Rule 71(3) EPC dated May 28, 2024 corresponding to European Patent Application No. 18934678.6.

* cited by examiner

GENERATION OF TUNNEL ENDPOINT IDENTIFIER FOR PACKET TUNNELING

FIELD

Embodiments of the present disclosure generally relate to the field of communications, and in particular, to a device, method, apparatus and computer readable storage media for generating a tunnel endpoint identifier (TEID) for packet tunneling.

BACKGROUND

In Cloud Radio Access Network (RAN), long term evolution (LTE) or the fifth generation (5G) radio user-plane (U-Plane) Virtual Networking Function Components (VNFCs) enables very big traffic throughput, for example, giga bits per second in a Radio Link Control (RLC) layer, in terms of receiving, processing and transmitting of Packet Data Convergence Protocol (PDCP) data. On Native Cloud, for 5G and the fourth generation (4G) U-Plane VNFCs, downlink (DL) user data may be forwarded to a target U-Plane VNFC via a Layer 2 (L2) switch behind a General Packet Radio Service (GPRS) Tunneling Protocol User Plane (GTP-U) tunnel endpoint, so as to accelerate the processing of the user data.

The GPRS Tunneling Protocol (GTP) is a communication protocol used in the LTE to deliver Internet Protocol (IP) packets within an Evolved Packet Core (EPC). The GTP version 1 User Plane (GTPv1-U) protocol is used to exchange user data in GTP tunnels over S1/X2 interfaces. An information packet for user equipment (UE) may be encapsulated in a GTPv1-U packet and tunneled between a Serving Gateway (S-GW) and an Evolved Node B (eNB) and thus transmitted to the UE over the S1 interface and a U interface between the eNB and the UE. There is one GTP-U tunnel per Evolved Packet System (EPS) bearer between the eNB and the S-GW. One UE may have more than one active EPS bearer. In addition, in the scenario of inter-eNB handover, a target eNB needs to establish DL GTP-U tunnel towards a source eNB for DL data forwarding from the source eNB to the target eNB during the handover.

During an initial attach procedure of a UE, the eNB allocates a TEID to an S1-U bearer and sends the TEID to a Mobility Management Entity (MME) which then passes the TEID to the S-GW.

Conventionally, a lookup table is used to record mapping relationship of a TEID and an internal address of a host, as a part of the eNB, such as Digital Signal Processor (DSP) or a VNFC such as a Virtual Machine (VM) or a docker container in cloud. The GTP-U tunnel may be ended at an internal component or entity of the eNB. By checking the lookup table, the component may forward the user traffic toward the internal address. However, the maintenance and checking of the lookup table is complex and time consuming.

SUMMARY

In general, example embodiments of the present disclosure provide a device, method, apparatus and computer readable storage media for generating a TEID for packet tunneling.

In a first aspect, a device is provided at least one processor and at least one memory including computer program code. The at least one memory and the computer program code are configured to, with the at least one processor, cause the device to generate a tunnel endpoint identifier for a tunnel from an upstream device to the downstream device at least in part based on a target address of an information packet to be transmitted in the tunnel. The device is further caused to send the tunnel endpoint identifier towards the upstream device for establishment of the tunnel.

In a second aspect, a method is provided. In the method, a TEID is generated at a downstream device for a tunnel from an upstream device to the downstream device at least in part based on a target address of an information packet to be transmitted in the tunnel. The generated TEID is sent towards the upstream device for establishment of the tunnel.

In a third aspect, there is provided an apparatus comprising means for performing the method according to the second aspect.

In a fourth aspect, there is provided a computer readable storage medium that stores a computer program thereon. The computer program, when executed by a processor of a device, causes the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

DETAILED DESCRIPTION

Figure 1:
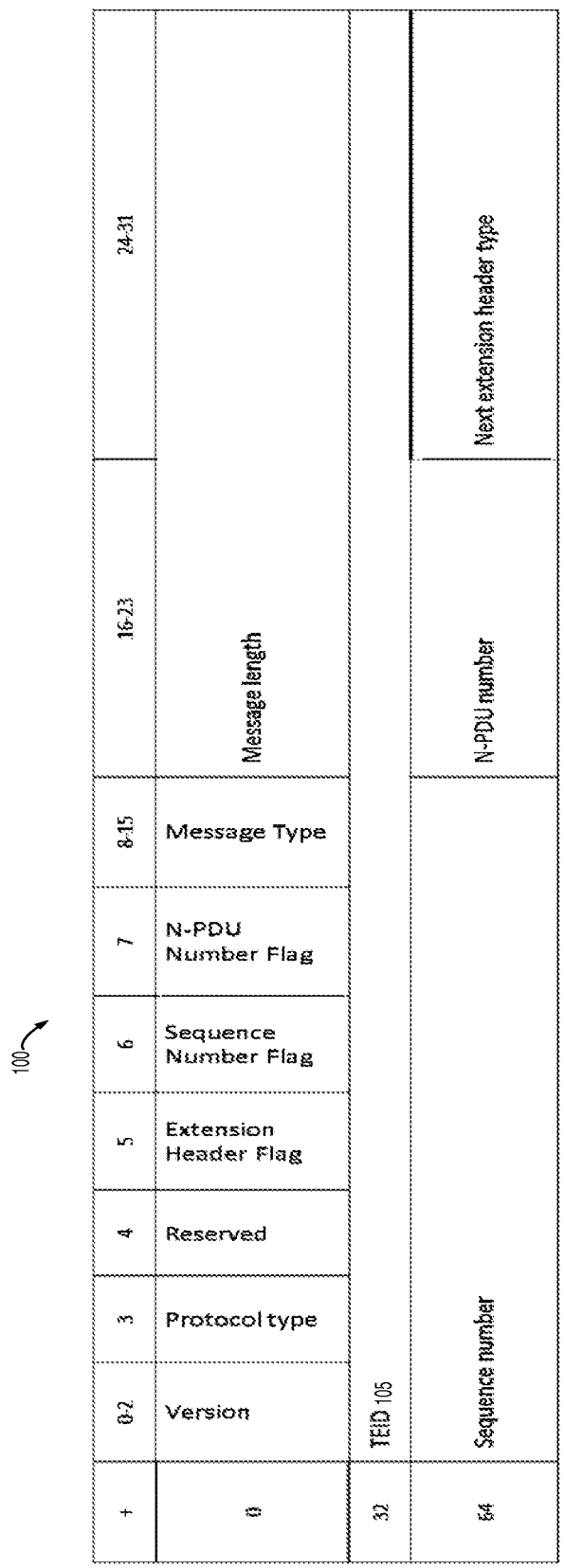
FIG. 1 illustrates an example structure of a GTPv1-U header.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "downstream device" refers to a device in a downstream location of a tunnel more close to a receiver. As used herein, the term "upstream device" refers to a device in an upstream location of the tunnel more close to a transmitter.

The downstream or upstream device may include any suitable communication device. Examples of the communication device include a network device such as a base station (BS), a relay, an access point (AP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, a router, a Service Gateway (S-GW), a Mobility Management Entity (MME), radio network controllers (RNCs), base station controllers (BSCs), Multi-cell/multicast Coordination Entities (MCEs), Mobile Switching Centers (MSCs) and the like. The communication device may also include a terminal device, such as user equipment (UE) such as smart phones, wireless-enabled tablet computers, laptop-embedded equipment (LEE), laptop-mounted equipment (LME), and/or wireless customer-premises equipment (CPE).

As used herein, the term "S1 interface" refers to an interface between the eNB and the MME and the S-GW. In some embodiments, this interface is based on GTP-U in the user plane.

As used herein, the term "X2 interface" refers to an interface between the eNBs. The interface is mainly used to support active mode UE mobility. This interface may also be used for multi-cell Radio Resource Management (RRM) functions. The X2-Control Plane (X2-CP) interface may consist of a signaling protocol called X2-Application Protocol (X2-AP) on top of Stream Control Transmission Protocol (SCTP). In some embodiments, the X2-User Plane (X2-UP) interface may be based on GTP-U. The X2-UP interface is used to support loss-less mobility.

As used herein, the term "circuitry" may refer to one or more or all of the following:
(a) hardware-only circuit implementations (such as implementations in only analog and/or digital circuitry) and
(b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, in the DL direction, the eNB may allocate a TEID to an S1-U bearer. The TEID may be contained in a GTP header. FIG. 1 illustrates an example structure of a GTPv1 header 100. As shown, in the GTPv1 header 100, the $32^{nd}$ to $63^{rd}$ bits carry a TEID 105.

Conventionally, in order to forward the DL user-plane traffic to a UE, a lookup table is used to record the mapping from the TEID to an internal address in a bare-metal eNB or a Media Access Control (MAC) address of a cloud eNB. The DL user-plane traffic may be forwarded to the target internal component or entity of the eNB by interpreting the TEID to the address of the component or entity through checking the lookup table.

Figure 2:
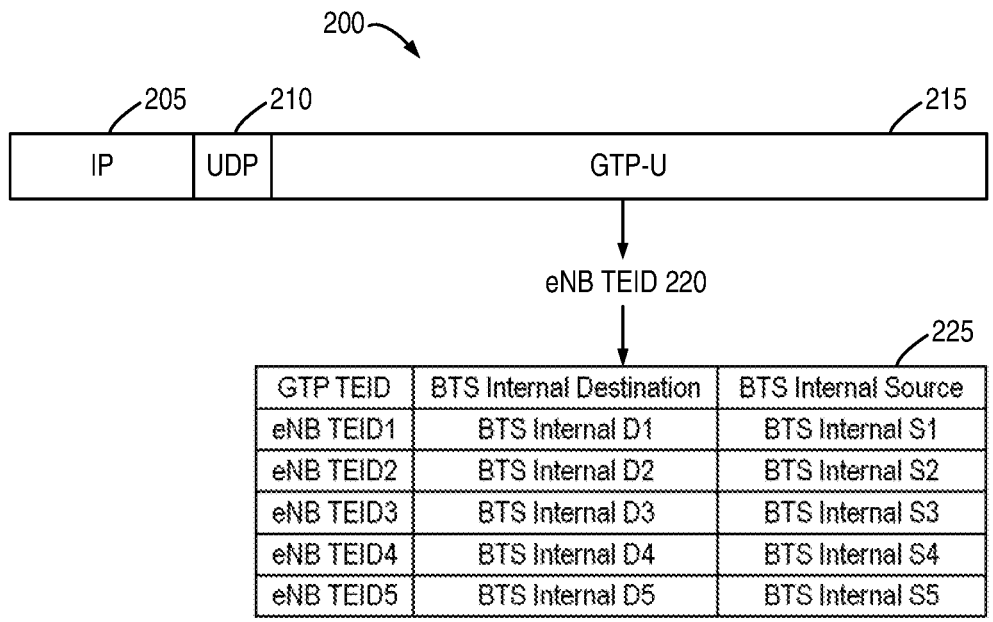
FIG. 2 illustrates example mapping of TEIDs to target addresses.

FIG. 2 illustrates example mapping of TEIDs to target addresses. As shown, a packet header 200 comprises an IP header 205, a User Datagram Protocol (UDP) header 310 and a GTP-U header 215. An eNB TEID 320 can be extracted from the GTP-U header 215. A lookup table 225 records the mapping between the GTP TEID and the Base Transceiver Station (BTS) internal addresses, including source and destination addresses. By checking the lookup table 225, the eNB TEID 320 may be interpreted into a BTS internal destination address.

The maintenance and checking of the lookup table is complex and time consuming. Moreover, the configuration and checking of the lookup table and the forwarding of the user data will induce large latency for data transmission.

Embodiments of the present disclosure provide a novel scheme of generating a tunnel endpoint identifier (TEID). With this scheme, the TEID is generated at least in part based on a target address of an information packet to be tunneled. The generated TEID is sent to an upstream device for establishment of a tunnel for the information packet. Thus, the target address may be retrieved directly from the TEID without checking the lookup table. The efficiency of address resolution and transmission may be increased significantly.

Figure 3:
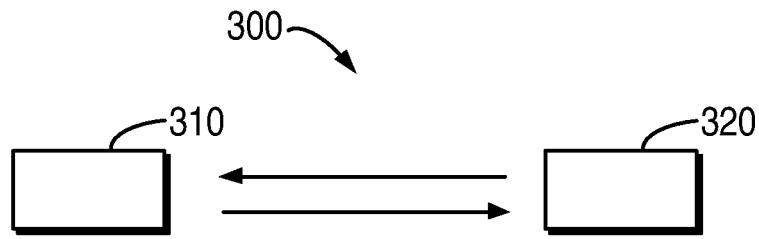
FIG. 3 illustrates an example environment in which embodiments of the present disclosure can be implemented.

FIG. 3 illustrates an example environment 300 in which embodiments of the present disclosure can be implemented. The environment 300, which may be a part of a communication network, comprises a downstream device 310 and an upstream device 320. For example, in the scenario where the DL data traffic is tunneled over the S1-U interfaces, the downstream device 310 may be implemented by an eNB, and the upstream device 320 may be implemented as an S-GW. In the scenario of inter-eNB handover, the downstream device 310 may be implemented by a target eNB, and the upstream device 320 may be implemented by a source eNB.

The downstream device 310 and the upstream device 320 can communicate in a wired or wireless mode directly or via an intermediate device (not shown). The communication may employ any suitable communication technology. The scope of the present disclosure will not be limited in this regard.

In various embodiments of the present disclosure, an information packet can be transmitted in a tunnel from the upstream device 320 to the downstream device 310. The information packet may be encapsulated using any suitable protocol such as IP, UDP, GTP and the like. In some embodiments, the information packet is a GTP-U data packet. Any suitable tunneling technology may be employed which already exists or will be developed in the future. In some embodiments, the tunneling may be based on the GTP tunneling technology. The tunneling may be also based on other virtual private network (VPN) technologies.

The downstream device 310 generates a TEID for the tunnel at least in part based on a target address of the information packet. The TEID is sent by the downstream device 310 to the upstream device 320. As such, the upstream device 320 may insert the TEID into the information packet, and therefore the downstream device 310 may obtain the target address of the information packet from the TEID.

Figure 4:
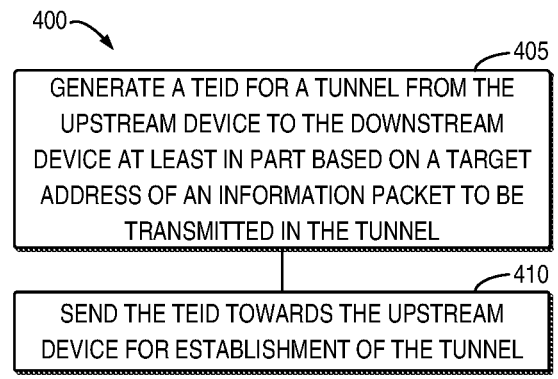
FIG. 4 illustrates a flowchart of an example method in accordance with some embodiments of the present disclosure.

FIG. 4 illustrates a flowchart of an example method 400 in accordance with some embodiments of the present disclosure. The method 400 can be implemented by the downstream device 310 as shown in FIG. 3. For the purpose of discussion, the method 400 will be described with reference to FIG. 3.

At block 405, the downstream device 310 generates a TEID for a tunnel from the upstream device 320 to the downstream device 310 at least in part based on a target address of an information packet to be transmitted in the tunnel. The information packet may be encapsulated in any suitable protocol, such as IP, MAC, UDP, GTU, PDCP and the like. In some embodiments, the information packet is a GTP-U data packet.

The target address may be an address associated with any suitable target device or entity of the information packet. In the embodiments where the downstream device 310 is implemented by an eNB, the target address may be an access address of an internal component or entity of the eNB. The access address may be a physical address or a virtual address to access the internal component or entity. The access address may be any type of address, such as an IP address, a MAC address, a predefined internal address, and the like. In the embodiments, the downstream device 310 is a cloud device and comprises at least one VNFC, the target address may be an access address, such as a MAC address, of one of the VNFCs.

Any suitable tunneling protocol and technology can be used, and any suitable TEID generation algorithm may be employed. For example, at least one part of the target address may be contained in the TEID. Alternatively, a variant of the target address, such as an encrypted target address, may be contained in the TEID.

The eNB may have a plurality of bearers for different UEs. One UE may have multiple bearers. In some embodiments, the bearer ID may be also used to generate the TEID so that the generated TEID is random and unique for the downstream device.

In addition, the data flow on one bearer may be assigned to one service or task. Multiple data flows on multiple bearers may be assigned to the same service or task. In some embodiments, the TEID may be generated further based on a service identifier (ID) for the information packet. The service ID may be a task ID for identifying an internal task of processing the information packet. For example, in the embodiments where the downstream device 310 is implemented by an eNB, the eNB may have a plurality of services for different UEs. A service for a UE may be processed in a task of a process or thread in a processor, such as a central processing unit (CPU), and identified by a task ID. In this case, the TEID may be generated further based on the task ID for the UE.

At block 410, the downstream device 310 sends the TEID towards the upstream device 320 for establishment of the tunnel. For example, in the embodiments where the downstream device 310 is implemented by an eNB and the upstream device 310 is implemented by an S-GW, the eNB may send the TEID to a MME via the S1 interface, and the MME forwards the TEID to the S-GW. In the embodiments where the downstream device 310 is implemented by a target eNB and the upstream device 320 is implemented by a source eNB in the scenario of inter-eNB handover, the TEID may be sent via an X2 interface from the target eNB to the source eNB.

When the upstream device 320 transmits the information packet in the tunnel to the downstream device 310, the upstream device 320 may insert the TEID into the information packet, for example, as a part of a header of the packet. Accordingly, the downstream device 310 may determine the target address of the information packet from the TEID.

Figure 5:
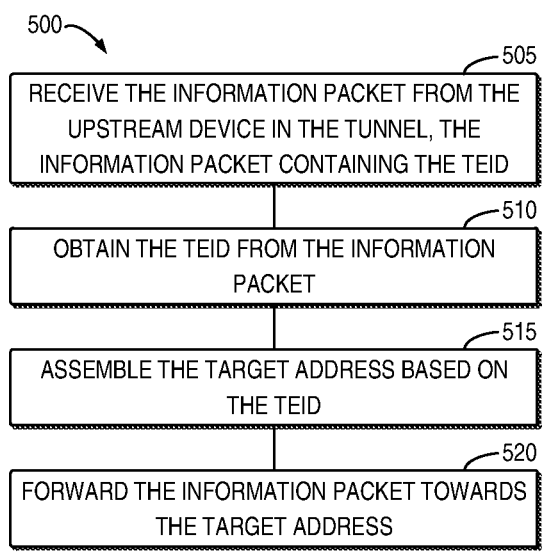
FIG. 5 illustrates an example process at the downstream device for processing the information packet containing the TEID in accordance with some embodiments of the present disclosure.

FIG. 5 illustrates an example process 500 at the downstream device 310 for processing the information packet containing the TEID in accordance with some embodiments of the present disclosure.

At block 505, the downstream device 310 receives the information packet from the upstream device 320 in the tunnel. The information packet contains the TEID. For example, in the case that the tunnel is a GTP-U tunnel, the TEID may be a GTP-U TEID and be inserted in a GTP header of the information packet. Other implementations of carrying the TEID in the information packet are possible.

At block 510, the downstream device 310 obtains the TEID from the information packet. At block 515, the downstream device 310 assembles the target address of the information based on the TEID. At block 520, the downstream device 310 forwards the information packet towards the target address.

Example processes and operations of the downstream device 310 and the upstream device 320 will be discussed below with reference to FIGS. 6-11. In these examples, as shown, the downstream device 310 is implemented by an eNB as a cloud VNF instance, and the upstream device 320 is implemented by an S-GW. The tunnel from the upstream device 320 to the downstream device 310 is used to tunnel the DL GTP-U data traffic towards a UE.

Figure 6:
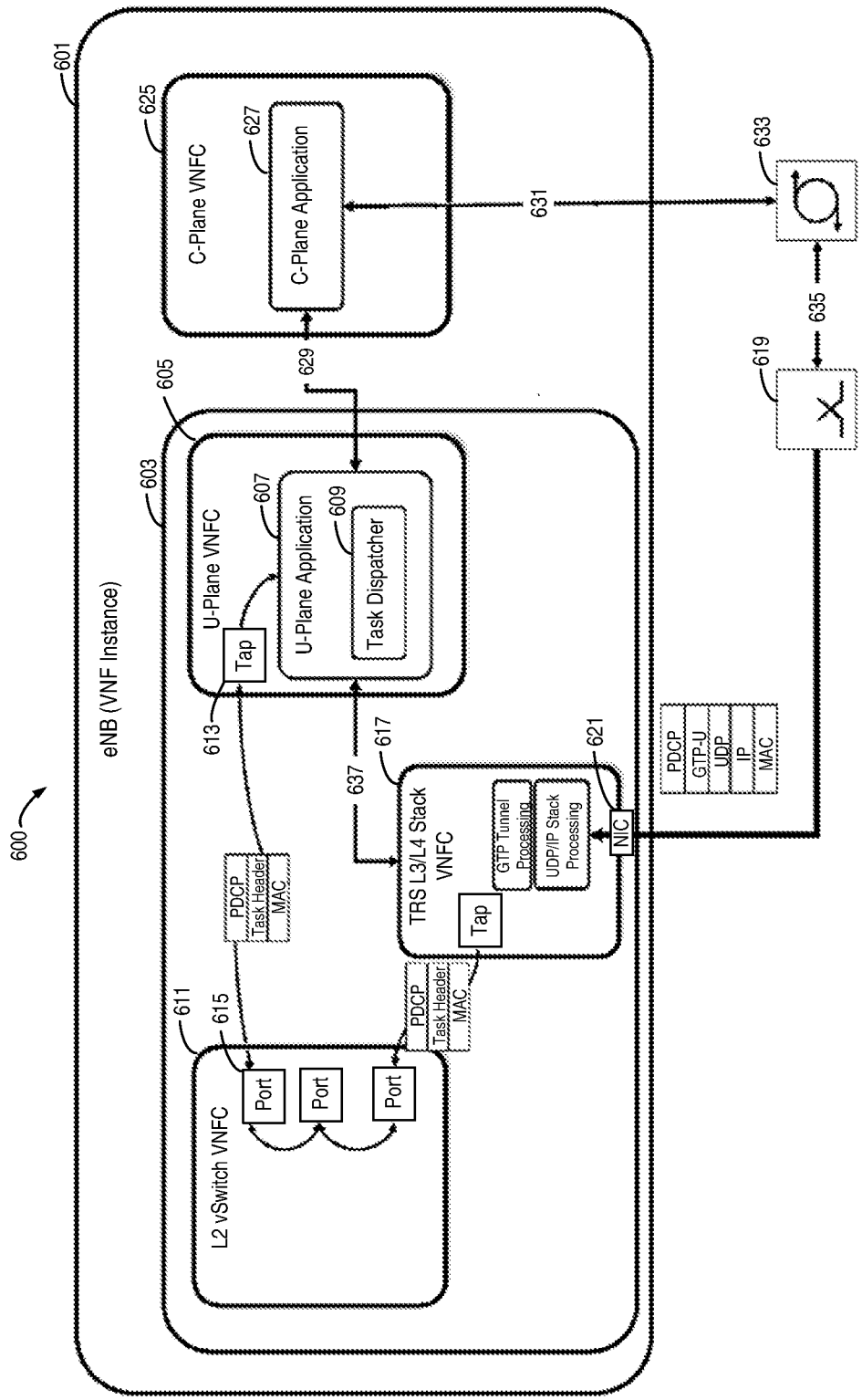
FIG. 6 illustrates an example architecture of the environment in accordance with some embodiments of the present disclosure.

FIG. 6 illustrates an example architecture 600 of the environment 300 in accordance with some embodiments of the present disclosure.

In this example, the eNB 601 (as the downstream device 310 in FIG. 3) is deployed via Virtual Machines or docker containers. As shown, the eNB 601 comprises a user plane (U-Plane) virtual machine (VM) and hardware (HW) 603.

The eNB 601 may optionally comprise a docker container. For example, the eNB 601 may comprise a U-Plane HW and docker container, or comprise a U-Plane HW, VM and docker container. The U-Plane VM and HW 603 comprises a U-Plane VNFC 605 for processing U-Plane data traffic towards a UE. Only one U-Plane VNFC is shown for the purpose of illustration, without suggesting any limitation. It is possible that multiple U-Plane VNFCs may scale-in/out as demanded. A U-Plane application 607 is executed on the U-Plane VNFC 605 and may invoke multiple tasks (or services) for processing data towards different UEs or on different bearers. A task dispatcher 609 is used to dispatch an incoming data flow to a target task. Each task is assigned to a unique task ID locally.

The U-Plane VNFC 605 is connected with a Layer 2 (L2) virtual switch (vSwitch) VNFC 611 via a tap 613 and a port 615. The U-Plane VNFC 605 may also be connected via the L2 vSwitch VNFC 611 with another U-Plane VNFC (not shown). The L2 vSwitch VNFC 611 may be implemented by a virtual linux bridge, an Open vSwitch, and the like. The L2 vSwitch VNFC 611 is connected with a transport (TRS) Layer 3/Layer 4 (L3/L4) stack VNFC 617. The TRS L3/L4 stack VNFC 617 is configured to perform L3/L4 stack processing and to forward the user data traffic to the L2 vSwitch VNFC 611. The TRS L3/L4 stack VNFC 617 can receive a data flow from an S-GW 619 (as the upstream device 320 in FIG. 3) via a network interface controller (NIC) 621.

It is to be understood that the TRS L3/L4 stack VNFC 617 is shown to be a separate component. In some deployments, the function of the TRS L3/L4 stack VNFC 617 may be integrated into the L2 vSwitch VNFC 611 as shown in FIG. 7.

Figure 7:
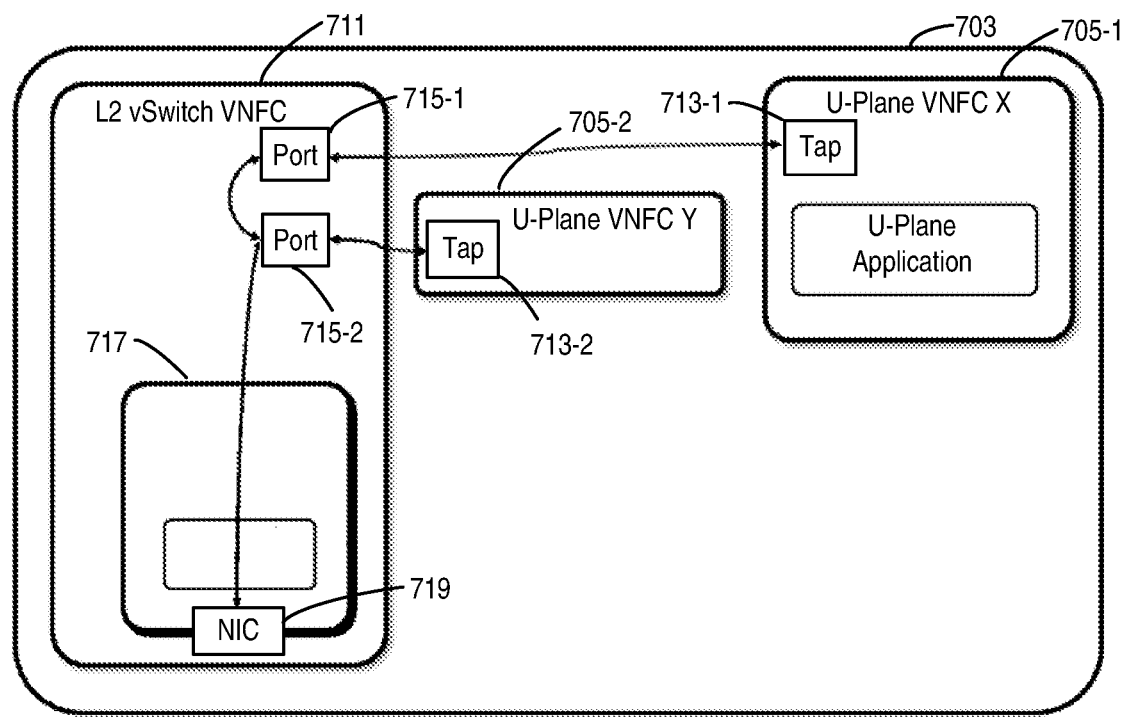
FIG. 7 illustrates an deployment of a U-Plane Virtual Machine (VM) or Hardware (HW) accordance with some embodiments of the present disclosure.

FIG. 7 illustrates another example deployment of a U-Plane VM or HW in accordance with some embodiments of the present disclosure. In this example, a U-Plane VM or HW 703 comprises two U-Plane VNFC 705-1 and 705-2 (collectively referred to as a U-Plane VNFC 705) which are connected to a L2 vSwitch VNFC 711 via taps 713-1 and 713-2 (collectively referred to as a tap 713) and ports 715-1 and 715-2 (collectively referred to as a port 715), respectively. The L2 vSwitch VNFC 711 comprises a TRS L3/L4 stack functionality 719 provided with a NIC 719. The TRS L3/L4 stack functionality 719 performs the function and operations of the TRS L3/L4 stack VNFC 617 as shown in FIG. 6.

Still with reference to FIG. 6, the eNB 601 further comprises a control plane (C-Plane) VNFC 625 where a C-Plane application 627 is executed. When a radio bearer is to be set up, the eNB 601 will establish a downlink GTP tunnel to the SGW 623. In order to establish the tunnel, as shown, the C-Plane VNFC 625 negotiates (629) with the U-Plane VNFC 605 to reserve resources, for example, including determining which U-Plane VNFC will be used, which task of the U-Plane VNFC will be available for user data traffic, and so on. Based on this negotiation, the downlink GTP-U TEID is generated. An example TEID will be discussed below with reference to FIG. 8.

Figure 8:
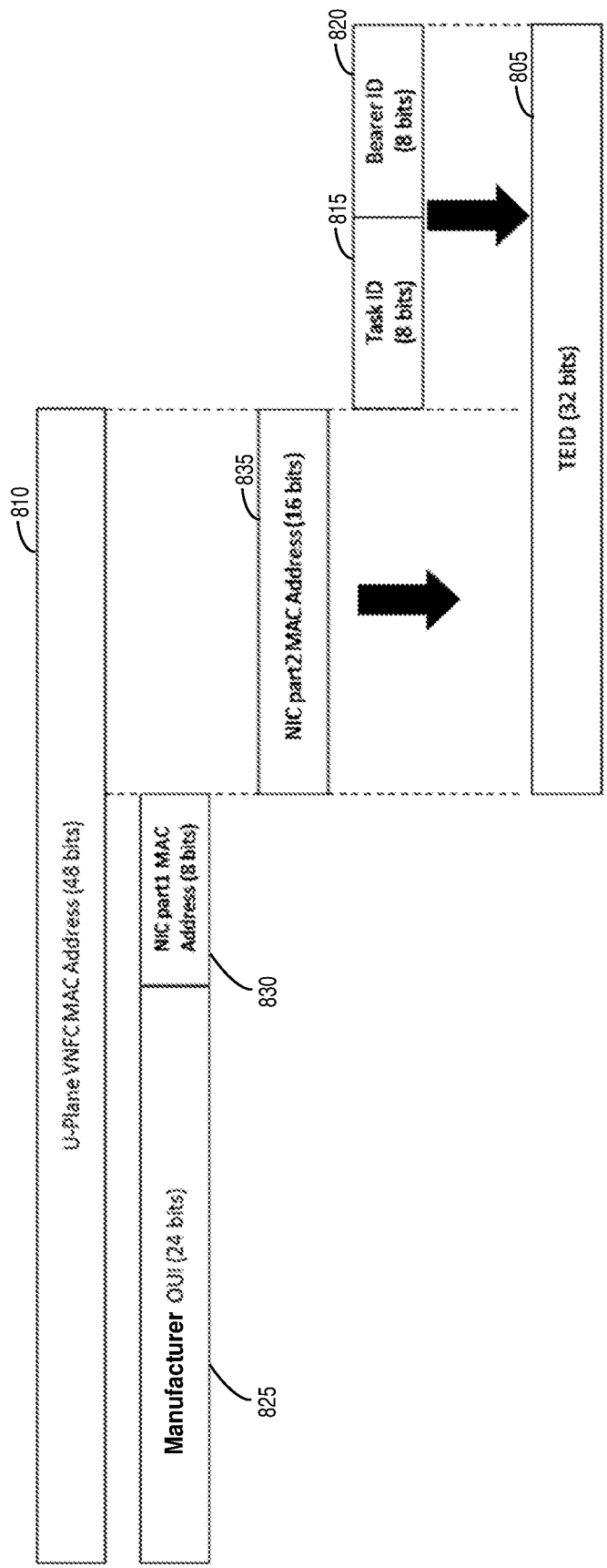
FIG. 8 illustrates an example structure of the TEID in accordance with some embodiments of the present disclosure.

FIG. 8 illustrates an example structure of the TEID in accordance with some embodiments of the present disclosure. In this example, the downlink GTP-U TEID 805 consists of a part of a U-Plane VNFC MAC address 810, a local task ID 815 and a local bearer ID 820.

As shown, the U-Plane VNFC MAC address 810 comprises a pre-defined base_mac 825, for example, including a 24-bit manufacturer's organizationally unique ID (OUI) and an 8-bit NIC part1 MAC address 830, and a 16-bit NIC part1 MAC address 835. The NIC part1 and part2 MAC addresses collectively form the real change part of the U-Plane VNFC MAC address 810.

In this example, the pre-defined base_mac 825 is implemented by 3-Octet (or 24-bit) base_mac=fa:16:3e:00:00:00, and the change part includes 3 Octets (or 24 bits). 4-octet base_mac=fa:16:3e:4f:00:00 is also possible since 2-octet change part may provide an enough address space for the U-Plane VNFC in one tenant network.

The downlink GTP-U TEID 805 only includes the 16-bit NIC part2 MAC address 835 of the U-Plane VNFC MAC address 810. As shown, the highest 2 Octets (or 16 bits) of the TEID 805 directly use the 16-bit NIC part1 MAC address 835. As an alternative example, a variant of the real change part of the U-Plane VNFC MAC address 810, such as the encrypted real change part may be used in the TEID 805 (not shown). Then, the real change part may be obtained through decryption.

The middle 8 bits of the TEID 805 use the task ID 815. The task ID 815 is used for identifying the local service task for processing the user data traffic. The 8-bit task ID 815 means 256 tasks in one U-Plane VNFC. The task ID 815 may be a process or thread ID or an event queue ID when using an event machine. The implementations of the task ID 815 depend on a task dispatcher mechanism to be used.

The lowest 8 bits of the TEID 805 use the bearer ID 820 to ensure that the TEID 805 is unique in the case that one UE have multiple bearers or different UEs is allocated to the same U-Plane VNFC and the same service or task. The EPS Bearer Identity (EBI) is of 4 bits which means total 16 bearers. However, the bearer ID 820 may include more bits to allow more bearers. In this example, 8-bit bearer ID 820 is used. In some other embodiments, the task ID 815 may be longer if more tasks are invoked, and the bearer ID 820 may be shorter accordingly.

Still with reference to FIG. 6, after the TEID is generated, the C-Plane VNFC 625 sends the TEID towards the tunnel peer, such as the S-GW 623. For example, as shown, the C-Plane VNFC 625 sends (631) the TEID to a MME 633 via an S1 interface, and then the MME 633 forwards (635) the TEID to the S-GW 623. In some embodiments, the tunnel peer may be a source eNB (not shown). In this case, the TEID may be sent to the source eNB via the X2 interface.

The U-Plane VNFC 605 requests (637) the TRS L3/L4 stack VNFC 617 to establish, based on the generated TEID, a GTP-U tunnel toward the S-GW 623 via the S1 interface or towards the source eNB via the X2 interface.

Figure 9:
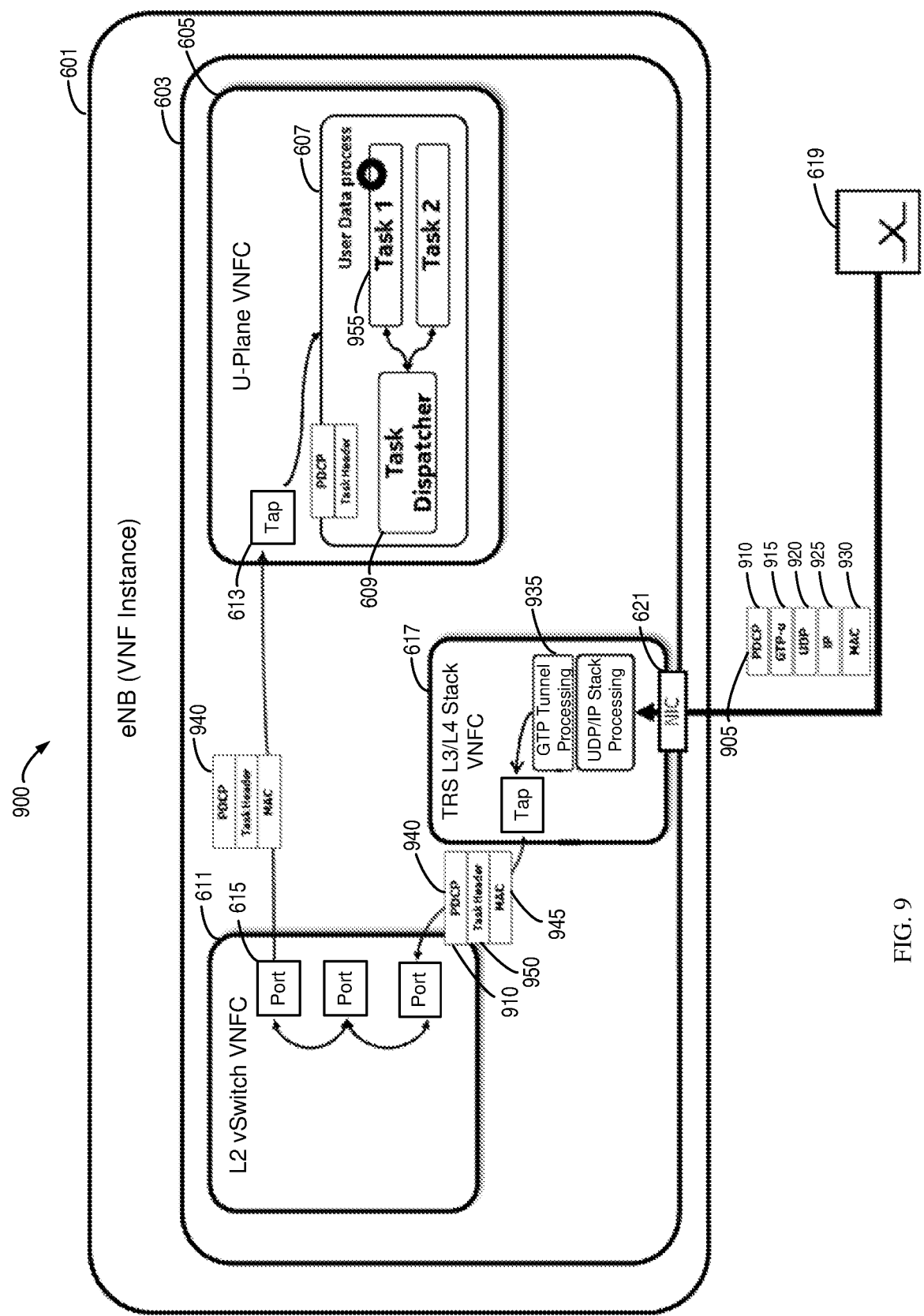
FIG. 9 illustrates an example process of tunneling the information packet in accordance with some embodiments of the present disclosure.

FIG. 9 illustrates an example process 900 of tunneling the information packet in accordance with some embodiments of the present disclosure. The process 900 is implemented in the architecture 600 as shown in FIG. 6.

In this example, the downlink GTP-U tunnel is started from the S-GW 619 and ended in the TRS L3/L4 Stack VNFC 617. An information packet 905 is received via the NIC 621 from the S-GW 619. The information packet 905 includes a PDCP payload 910, a GTP-U header 915, a UDP header 920, an IP header 925 and a MAC header 930 from inside to outside, as shown.

When the information packet 905 is received, a GTP tunnel processing module 935 in the TRS L3/L4 Stack VNFC 917 re-encapsulates the PDCP payload 910 into an Ethernet frame 940. For example, the GTP tunnel processing module 935 extracts the GTP-U TEID from the GTP-U header 915 and then determines the target MAC address from the GTP-U TEID. An example process of determining the target MAC address from the GTP-U TEID will be discussed below with reference to FIG. 10.

Figure 10:
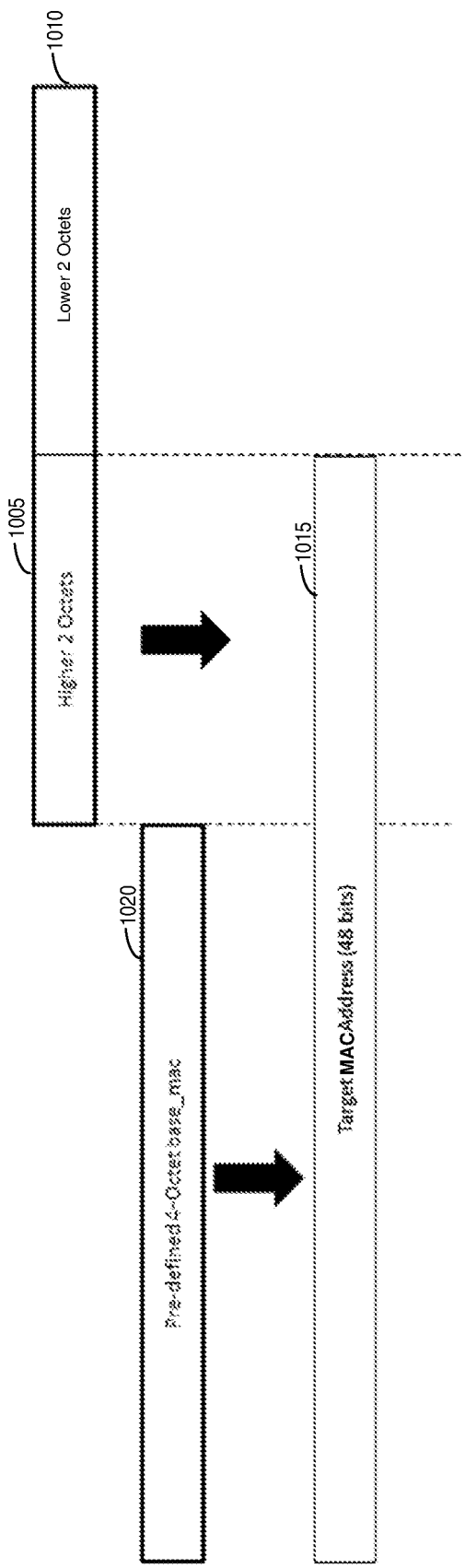
FIG. 10 illustrates an example reassembling of the target MAC address based on the TEID in accordance with some embodiment of the present disclosure.

FIG. 10 illustrates an example reassembling of the target MAC address based on the TEID in accordance with some embodiment of the present disclosure. In this example, the higher 16 bits (or 2 Octets) 1005 in the TEID 1010 are generated based on the real change part of a target MAC address 1015, and therefore are used to reassemble the target MAC address 1015 together with a pre-defined 32-bit (or 4-Octet) base-mac 1020. As another example, the target MAC address may include a predefined 24-bit (or 3-Octet) base_mac and the 24-bit real change part which is used to generate the TEID (not shown). In this case, the higher 24 bits (3 Octets) in the TEID are used to reassemble the target MAC address together with the pre-defined 24-bit (or 3-Octet) base-mac.

Still with reference to FIG. 9, after the GTP tunnel processing module 935 determines the target MAC address from the GTP-U TEID, the target MAC address is inserted into a MAC header 945 of the Ethernet frame 940. In order to allocate the data traffic to the target task, an extra task header 950 may be added before the PDCP payload 910. The task header 950 contains the task ID which is also determined from the GTP-U TEID extracted from the GTP-U header 915. Optionally, the task header 950 may also contain a bear ID which can be further delivered to the U-Plane application 607 for processing. The TRS L3/L4 Stack VNFC 617 sends the Ethernet frame 940 to the L2 vSwitch VNFC 611, and the L2 vSwitch VNFC 611 forwards the Ethernet frame 940 to the U-Plane application 607 on the U-Plane VNFC 605 based on the task ID. The data forwarding in the L2 vSwitch VNFC 611 is pure L2 switching. The task dispatcher 609 in the U-Plane application 607 dispatches the data traffic to a task 955 based on the task ID.

Based on the TEID, the DL U-Plane data may be forwarded to the target U-Plane VNFC faster. The addressing efficiency may be increased. Moreover, based on the target MAC address extracted from the GTP-U TEID, the U-Plane data may be re-encapsulated into an Ethernet packet which could be directly exchanged through the L2 switching. The transmission efficiency may be increased.

Figure 11:
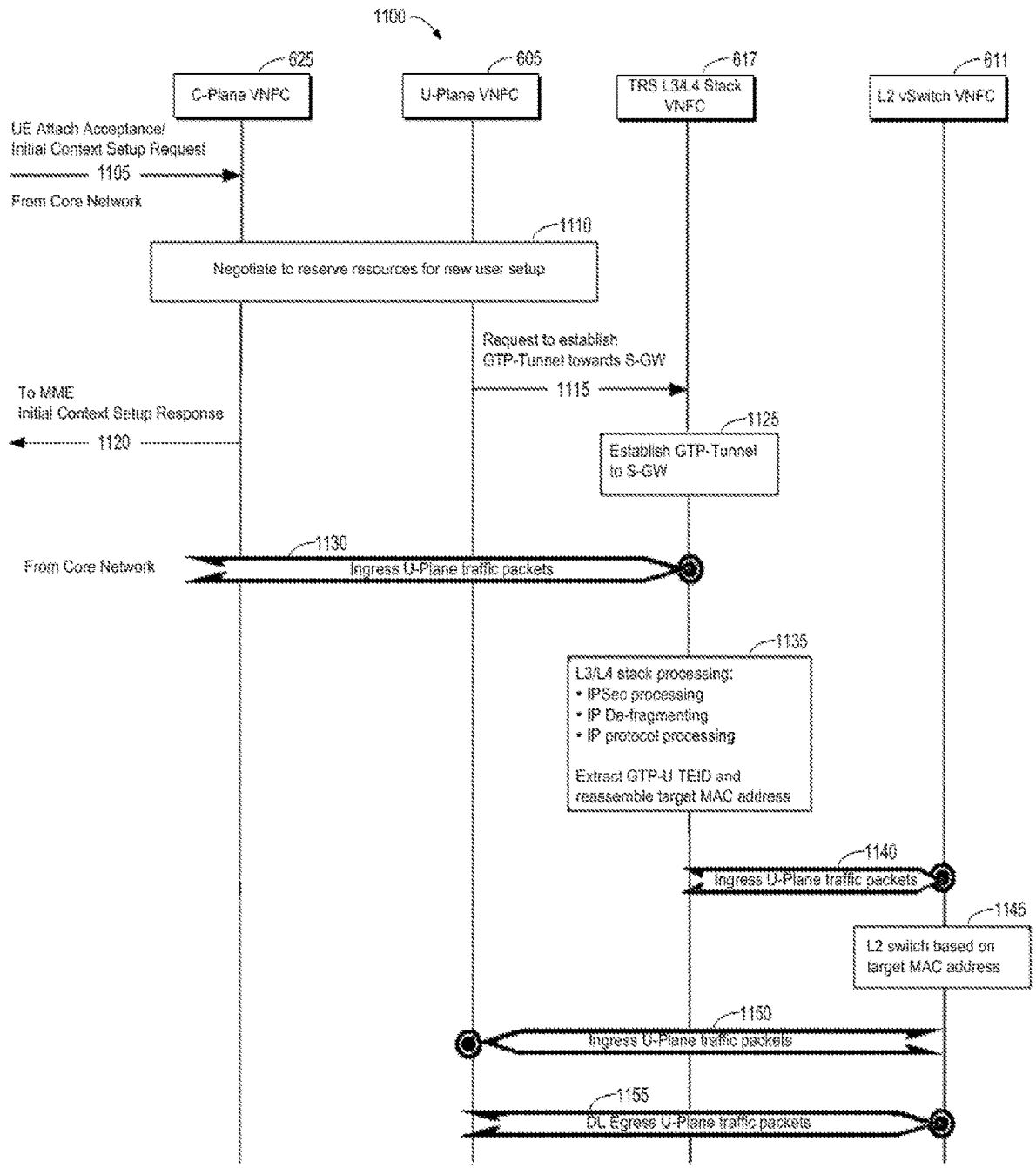
FIG. 11 illustrates an example process of processing and operating at various network components in accordance with some embodiments of the present disclosure.

FIG. 11 illustrates an example process 1100 of processing and operating at various network components in accordance with some embodiments of the present disclosure. The process 1100 can be implemented in the architecture as shown in FIG. 6. For the purpose of discussion, the process 1100 will be described with reference to FIG. 6.

In the process 1100, a notification of UE attach acceptance from the core network is received (1105). In addition or alternatively, an initial context setup request may be received at 1105. The C-Plane VNFC 625 and the U-Plane VNFC 605 negotiate to reserve resources for new user setup. For example, it is determined that which U-Plane VNFC is used, which task is invoked, and so on. The U-Plane VNFC 605 requests (1115) the TRS L3/L4 stack VNFC 617 to establish a GTP-tunnel towards the S-GW 619. The C-Plane VNFC 625 sends (1120) an initial context setup response to the MME to inform the MME of the TEID (for example contained in the response). The TRS L3/L4 stack VNFC 617 establishes (1125) the GTP-tunnel to the S-GW 619.

When ingress U-Plane traffic packets are received (1130) from the core network, the TRS L3/L4 stack VNFC 617 performs L3/L4 processing, such as IP Security (IPSec) processing, IP de-fragmenting and IP protocol processing, and then extracts the GTP-U TEID and reassembles the target MAC address (1135). The TRS L3/L4 stack VNFC 617 transmits (1140) the ingress U-Plane traffic packets to the L2 vSwitch VNFC 611. The L2 vSwitch VNFC 611 performs (1145) L2 switching based on the target MAC address, and then forwards (1150) the ingress U-Plane traffic packets to the U-Plane VNFC 605.

After processing of the ingress U-Plane traffic packets, the U-Plane VNFC 605 transmits (1155) the DL egress U-Plane traffic packets to the L2 vSwitch VNFC 611. The L2 vSwitch VNFC 611 and the TRS L3/L4 stack VNFC 617 may exchange or process the U-Plane traffic packets to radio nodes and further to the UE.

In some embodiments, an apparatus capable of performing the method 400 may comprise means for performing the respective steps of the method 400. The means may be implemented in any suitable form. For example, the means may be implemented in a circuitry or software module.

In some embodiments, the apparatus capable of performing the method 400 comprises: means for generating, at a downstream device, a tunnel endpoint identifier for a tunnel from an upstream device to the downstream device at least in part based on a target address of an information packet to be transmitted in the tunnel; and means for sending the tunnel endpoint identifier towards the upstream device for establishment of the tunnel.

In some embodiments, the information packet may be based on GTP.

In some embodiments, the information packet may be a GTP-U data packet.

In some embodiments, the means for generating the tunnel endpoint identifier at least in part based on the target address may comprise means for generating the tunnel endpoint identifier based on the target address and a bearer identifier for the information packet.

In some embodiments, the means for generating the tunnel endpoint identifier at least in part based on the target address may comprise means for generating the tunnel endpoint identifier based on the target address and a service identifier and a bearer identifier for the information packet.

In some embodiments, the service identifier may comprise a task identifier for the information packet in the downstream device.

In some embodiments, the downstream device may comprise a VNFC, and the target address may be an access address of the VNFC.

In some embodiments, the access address of the VNFC may a MAC address of the VNFC.

In some embodiments, the apparatus may further comprise: means for receiving the information packet from the upstream device in the tunnel, the information packet containing the tunnel endpoint identifier; means for obtaining the tunnel endpoint identifier from the information packet; means for assembling the target address based on the tunnel endpoint identifier; and means for forwarding the information packet towards the target address.

Figure 12:
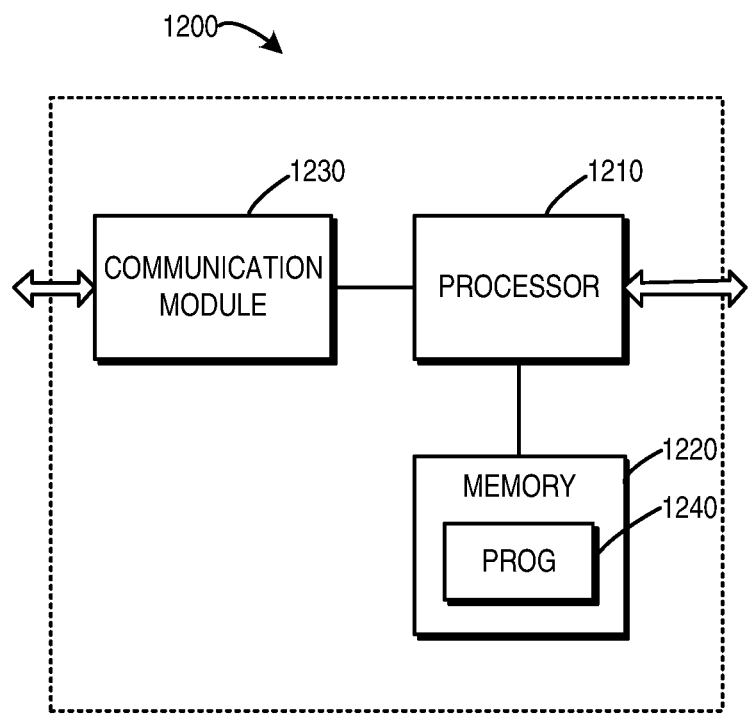
FIG. 12 illustrates a simplified block diagram of a device that is suitable for implementing embodiments of the present disclosure.

FIG. 12 is a simplified block diagram of a device 1200 that is suitable for implementing embodiments of the present disclosure. The device 1200 can be implemented at or at least as a part of the downstream device 310 as shown in FIG. 3 or the eNB 601 as shown in FIG. 6.

As shown, the device 1200 includes a processor 1210, a memory 1220 coupled to the processor 1210, a communication module 1230 coupled to the processor 1210, and a communication interface (not shown) coupled to the communication module 1230. The memory 1220 stores at least a program 1240. The communication module 1230 is for bidirectional communications. The communication interface may represent any interface that is necessary for communication.

The program 1240 is assumed to include program instructions that, when executed by the associated processor 1210, enable the device 1200 to operate in accordance with the embodiments of the present disclosure, as discussed herein with reference to FIGS. 3-11. The embodiments herein may be implemented by computer software executable by the processor 1210 of the device 1200, or by hardware, or by a combination of software and hardware. The processor 1210 may be configured to implement various embodiments of the present disclosure.

The memory 1220 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1220 is shown in the device 1200, there may be several physically distinct memory modules in the device 1200. The processor 1210 may be of any type suitable to the local technical network, and may include one or more of general purpose computers, special purpose computers, microprocessors, digital signal processors (DSPs) and processors based on multicore processor architecture, as non-limiting examples. The device 1200 may have multiple processors, such as an application specific integrated circuit chip that is slaved in time to a clock which synchronizes the main processor.

All operations and features as described above with reference to FIGS. 3-11 are likewise applicable to the device 1200 and have similar effects. For the purpose of simplification, the details will be omitted.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 400 and the processes 500, 900 and 1100 as described above with reference to FIGS. 3-11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

Various abbreviations that appear in the description and/or in the drawings are defined as below:

| | |
|---|---|
| TEID | Tunnel Endpoint Identifier |
| RAN | Radio Access Network |
| LTE | Long Term Evolution |
| VNFC | Virtual Networking Function Component |
| RLC | Radio Link Control |

-continued

| | |
|---|---|
| MAC | Media Access Control |
| PDCP | Packet Data Convergence Protocol |
| GPRS | General Packet Radio Service |
| GTP | GPRS Tunneling Protocol |
| GTP-U | GTP User Plane |
| GTP-C | GTP Control Plane |
| U-Plane | User Plane |
| C-Plane | Control Plane |
| UE | User Equipment |
| eNB | Evolved Node B |
| S-GW | Serving Gateway |
| MME | Mobility Management Entity |
| EPS | Evolved Packet System |
| NR | New Radio |
| EPC | Evolved Packet Core |
| IP | Internet Protocol |
| UDP | User Datagram Protocol |

What is claimed is:

1. A device comprising:
at least one processor; and
at least one memory including computer program code;
the at least one memory and the computer program code configured to, with the at least one processor, cause the device to:
generate, at a downstream device, a tunnel endpoint identifier for a tunnel from an upstream device to the downstream device, wherein the tunnel endpoint identifier at least comprises a part of a target address of an information packet to be transmitted in the tunnel; and
send the tunnel endpoint identifier towards the upstream device for establishment of the tunnel.

2. The device of claim 1, wherein the information packet is based on a general packet radio service tunneling protocol (GTP), and comprises a general packet radio service tunneling protocol-user plane (GTP-U) data packet.

3. The device of claim 1, wherein the device caused to generate the tunnel endpoint identifier at least in part based on the target address comprises the device caused to:
generate the tunnel endpoint identifier based on the target address and a bearer identifier for the information packet.

4. The device of claim 1, wherein the device caused to generate the tunnel endpoint identifier at least in part based on the target address comprises the device caused to:
generate the tunnel endpoint identifier based on the target address and a bearer identifier and a service identifier for the information packet, and wherein the service identifier comprises a task identifier for the information packet in the downstream device.

5. The device of claim 1, wherein the downstream device comprises a virtual networking function component (VNFC), and the target address is an access address of the VNFC, and wherein the access address of the VNFC is a MAC address of the VNFC.

6. The device of claim 1, wherein the device is further caused to:
receive the information packet from the upstream device in the tunnel, the information packet containing the tunnel endpoint identifier;
obtain the tunnel endpoint identifier from the information packet;
assemble the target address based on the tunnel endpoint identifier; and
forward the information packet towards the target address.

7. A method, comprising:
generating, at a downstream device, a tunnel endpoint identifier for a tunnel from an upstream device to the downstream device, wherein the tunnel endpoint identifier at least comprises a part of a target address of an information packet to be transmitted in the tunnel; and
sending the tunnel endpoint identifier towards the upstream device for establishment of the tunnel.

8. The method of claim 7, wherein the information packet is based on a general packet radio service tunneling protocol (GTP), and wherein the information packet comprises a general packet radio service tunneling protocol-user plane (GTP-U) data packet.

9. The method of claim 7, wherein generating the tunnel endpoint identifier at least in part based on the target address comprises:
generating the tunnel endpoint identifier based on the target address and a bearer identifier for the information packet.

10. The method of claim 7, wherein generating the tunnel endpoint identifier at least in part based on the target address comprises:
generating the tunnel endpoint identifier based on the target address and a bearer identifier and a service identifier for the information packet, and wherein the service identifier comprises a task identifier for the information packet in the downstream device.

11. The method of claim 7, wherein the downstream device comprises a virtual networking function component (VNFC), and the target address is an access address of the VNFC, and wherein the access address of the VNFC is a MAC address of the VNFC.

12. The method of claim 7, further comprising:
receiving the information packet from the upstream device in the tunnel, the information packet containing the tunnel endpoint identifier;
obtaining the tunnel endpoint identifier from the information packet;
assembling the target address based on the tunnel endpoint identifier; and
forwarding the information packet towards the target address.

13. A computer program embodied on a non-transitory computer-readable storage medium, said computer program comprising program instructions stored thereon, the instructions, when executed by a processor of a device, causing the device to perform actions comprising:
generating, at a downstream device, a tunnel endpoint identifier for a tunnel from an upstream device to the downstream device, wherein the tunnel endpoint identifier at least comprises a part of a target address of an information packet to be transmitted in the tunnel; and
sending the tunnel endpoint identifier towards the upstream device for establishment of the tunnel.

14. The computer program of claim 13, wherein the information packet is based on a general packet radio service tunneling protocol (GTP), and wherein the information packet comprises a general packet radio service tunneling protocol-user plane (GTP-U) data packet.

15. The computer program of claim 13, wherein generating the tunnel endpoint identifier at least in part based on the target address comprises:
generating the tunnel endpoint identifier based on the target address and a bearer identifier for the information packet.

16. The computer program of claim 13, wherein generating the tunnel endpoint identifier at least in part based on the target address comprises:

generating the tunnel endpoint identifier based on the target address and a bearer identifier and a service identifier for the information packet, and wherein the service identifier comprises a task identifier for the information packet in the downstream device.

17. The computer program of claim 13, wherein the downstream device comprises a virtual networking function component (VNFC), and the target address is an access address of the VNFC, and wherein the access address of the VNFC is a MAC address of the VNFC.

18. The computer program of claim 13, wherein the actions further comprise:

receiving the information packet from the upstream device in the tunnel, the information packet containing the tunnel endpoint identifier;

obtaining the tunnel endpoint identifier from the information packet;

assembling the target address based on the tunnel endpoint identifier; and forwarding the information packet towards the target address.

\* \* \* \* \*